Dec. 1, 1936.                R. W. SEXTON                2,062,336
            ORNAMENTAL FABRIC AND METHOD OF PRODUCTION
                        Filed Sept. 11, 1933
Fig. 1,
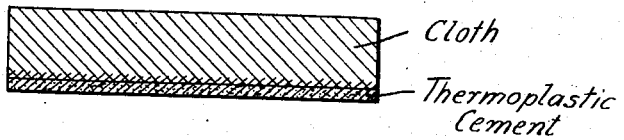
Fig. 2,
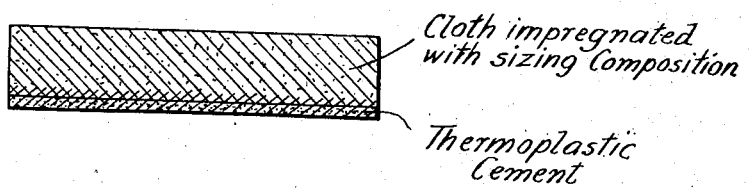
Fig. 3,
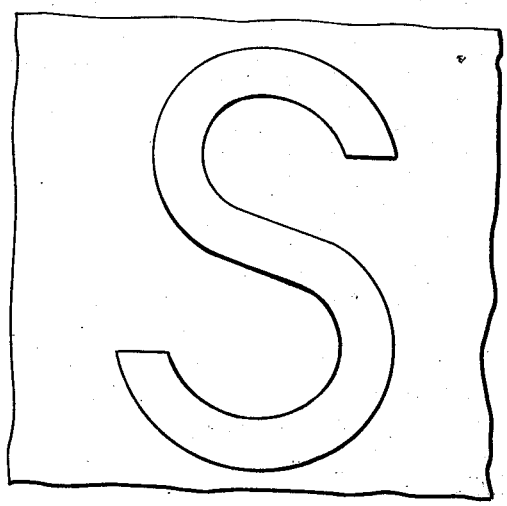
Fig. 4.
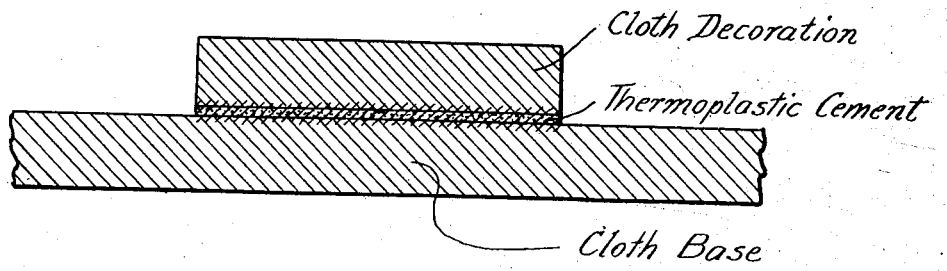
INVENTOR
ROY W. SEXTON
BY
Pennie, Davis, Marvin and Edmonds
ATTORNEYS Patented Dec. 1, 1936

2,062,336

UNITED STATES PATENT OFFICE 2,062,336

ORNAMENTAL FABRIC AND METHOD OF PRODUCTION

Roy W. Sexton, Wytheville, Va., assignor to Parfek, Inc., a corporation of Delaware Application September 11, 1933, Serial No. 689,022

4 Claims. (Cl. 41—34)

This invention relates to the art of uniting articles by means of adhesive compositions and has for an object the production of improved composite articles. Another object of the invention is to provide an improved method for attaching fabric decorations to fabric bases. The invention further contemplates the production of improved articles comprising cloth bases having cloth decorations such, for example, as initials, monograms, designs, motifs, labels, woven and printed names, and the like, attached thereto by means of adhesive compositions. A further object of the invention is to provide cloth decorations having adhering films of thermoplastic compositions by means of which they may be attached to cloth bases to form improved composite articles.

This application is a continuation in part of my application Serial No. 659,459 filed March 3, 1933 (United States Patent No. 1,926,918).

According to the present invention, a thermoplastic cement is applied in the form of a relatively thin film to a surface of a fabric layer to which another layer is to be united. The cement employed is preferably one which is soft and pliable in sheet form, and the thickness of the film is preferably such that its resistance to bending is negligible. According to a preferred method of the invention, the cement is applied to a surface of the decoration in the form of a solution capable of penetrating the fabric sufficiently to form bonds between adjacent fibers. In the production of articles which may be subjected to laundering or dry cleaning operations, I prefer to employ cements capable of resisting the action of the water and other cleansing agents employed in those operations. Cement compositions comprising cellulose esters are particularly suitable for use in carrying out the method of the invention and in forming the products and articles of the invention.

The cement-coated products of the invention may be coated with sizing compositions, which prevent breaking down of the surface material and prevent drawing of the cement to the surface of the fabric and/or which facilitate ironing by preventing sticking.

In practicing the invention, a coating of a solution of a suitable thermoplastic cement may be applied to a fabric in sheet form, or as cut out decorations, and dried to form a substantially continuous thin film, and the coated fabric may be applied to a fabric base by means of heat and pressure.

In carrying out the invention, a film of thermoplactic cement may be superposed on one side of the fabric decoration, or, more preferably in large scale production, a fabric sheet from which the decorations are subsequently cut, by any means known in the coating art, as, for example, by spraying, roller coating, or knife coating.

The preferred thermoplastic cement comprises a cellulose derivative and a thermoplastic resin compatible therewith. Suitable cellulose derivatives include cellulose nitrate, cellulose acetate, cellulose ether and cellulose xanthate. As will be understood by those skilled in the art, the cellulose derivative and resin are dissolved in solvents so that uniform films may be formed or deposited on the fabrics, but the solvents volatilize and do not play any part in the properties of the films thereafter. In the production of the cements, the polyhydric alcohol-polybasic acid synthetic resins are preferably employed, but other thermoplastic resins compatible with the cellulose derivative may be used, as for example, vinyl resins (acetate chloride or mixed acetate chloride), certain phenol-formaldehyde resins and toluene sulfonamide-formaldehyde resins. The polyhydric alcohol-polybasic acid synthetic resins in general are suitable. They include the glycerol phthalates, ethylene glycol phthalates, diethylene glycol phthalates, and other polyhydric alcohol-polybasic acid synthetic resins, such as are well known to the art, either modified or not. It is preferred to employ non-drying vegetable oil modified polyhydric alcohol-polybasic acid synthetic resins, and such resins may be modified by castor oil, cocoanut oil, cottonseed oil, hydrogenated cottonseed oil, and similar non-drying vegetable oils, as will occur to those skilled in the art. The drying oil modified polyhydric alcohol-polybasic acid resins may be used but are not preferred, as a cement based on this type of resin tends to lose some of its elasticity and flexibility and to become brittle due to gradual oxidation of the oil ingredient. Alcohol modified resins of this type are entirely suitable. Thus, for example, butyl alcohol modified polyhydric alcohol-polybasic acid resins have been found satisfactory.

The cellulose derivatives employed may be widely varied. Thus, for example, cellulose nitrate having a viscosity of well below 4 seconds to cellulose nitrate having a viscosity of 80 seconds, or above, may be employed. The upper limit of the viscosity characteristic is dependent only upon the practical workability of the solution. The nitrogen content of the cellulose nitrate may vary between 10.0 and 12.2%, which includes practically all available lacquer celluose nitrates.

The following examples illustrate formulas of thermoplastic cements which have been found to be suitable for use in the present invention:

*Example 1*

| | Per cent |
|---|---|
| Cellulose nitrate (viscosity 6–10 sec.) | 2.8 |
| Cellulose nitrate (viscosity approx. ½ sec.) | 5.4 |
| Denatured alcohol | 10.0 |
| Toluol | 29.0 |
| Ethyl acetate | 33.0 |
| Dibutyl phthalate | 6.4 |
| "Synthetic" resin | 13.4 |
| | 100.0 |

The viscosity of the cellulose nitrates given above and mentioned elsewhere in this specification is determined according to the method outlined in the A. S. T. M. Tentative specifications and tests for soluble nitrocellulose, designation D—301—30T, Formula A.

The nitrogen contents of the cellulose nitrates noted in this example are from 11.8 to 12.1%.

*Example 2*

| | Per cent |
|---|---|
| Cellulose nitrate (viscosity 80 sec.) | 11.3 |
| Denatured alcohol | 8.6 |
| Dibutyl phthalate | 13.5 |
| Toluene | 16.0 |
| Ethyl acetate | 19.9 |
| "Synthetic" resin | 30.7 |
| | 100.0 |

The nitrogen content of the cellulose nitrate in this example is 11.4 to 11.6%.

*Example 3*

| | Per cent |
|---|---|
| Cellulose acetate | 9.6 |
| Dibutyl phthalate | 6.5 |
| Ethylene dichloride | 50.3 |
| Ethyl acetate | 8.7 |
| Ethyl alcohol | 5.2 |
| Methyl CelloSolve | 4.5 |
| CelloSolve acetate | 2.3 |
| Synthetic resin | 12.9 |
| | 100.0 |

*Example 4*

| | Per cent |
|---|---|
| Ethyl cellulose | 15.3 |
| Dibutyl phthalate | 10.9 |
| Ethylene dichloride | 42.6 |
| Ethyl acetate | 7.4 |
| Ethyl alcohol | 4.4 |
| Methyl CelloSolve | 3.8 |
| CelloSolve acetate | 2.0 |
| Synthetic resin | 13.6 |
| | 100.0 |

*Example 5*

| | Per cent |
|---|---|
| Benzylcellulose | 17.1 |
| Dibutyl phthalate | 8.7 |
| Ethylene dichloride | 44.5 |
| Ethyl acetate | 7.8 |
| Ethyl alcohol | 4.6 |
| Methyl CelloSolve | 3.9 |
| CelloSolve acetate | 2.0 |
| Synthetic resin | 11.4 |
| | 100.0 |

The "synthetic" resin in Examples 1 to 5 is a reaction product of

| | Per cent |
|---|---|
| Phthalic anhydride | 45.8 |
| Glycerol | 28.8 |
| Castor oil | 25.4 |
| | 100.0 |

This resin is prepared by charging the ingredients into an aluminum kettle fitted with a mechanical stirring device and a thermometer. The batch is heated up to 225° C. in thirty minutes and held at this temperature until an acid number of 15—15 is reached, stirring being maintained throughout the run. The heating cycle is about 4½ hours.

The chemical names of "Methyl CelloSolve" and "CelloSolve acetate" referred to in Examples 3 to 5 are "Ethyleneglycol monomethyl ether" and "Ethyleneglycol monoethyl ether acetate", respectively.

A thermoplastic cement is preferably applied to the fabric sheet or decoration, preferably by knife coating or roller coating and the volatile solvents are permitted to completely evaporate. Drying at room temperature for periods of from 3–20 minutes usually suffices, although a short force dry at low temperatures is sometimes preferable.

The fabric sheet or decoration is now finished, insofar as coating is concerned, where the decoration is to be applied to a fabric base to produce an article which is not to be subjected to laundering, for example, as in the case of pennants. Where an article to be laundered is desired, subsequent treatment of the fabric sheet or initial is desirable.

If the finished article is to be laundered repeatedly, it has been found preferable, in order to obtain the best results, to treat the fabric or decoration either before or after coating with the thermoplastic adhesive with a size composition on the opposite face. A size composition is employed which is designed primarily to prevent breaking down of the surface of the material and to fill the pores between the threads, so that when heat is applied during normal laundering operations, the thermoplastic cement may not be drawn to the surface of the fabric, thus causing substantial loss in adhesion and possible discoloration.

The particular size composition employed may be varied considerably, although it will be understood that a composition should be selected that will not be deleteriously affected by laundering. The following example (Example 6) illustrates a highly suitable size composition that does not substantially alter the appearance or "hand" of the fabric. This composition may be applied to the fabric by means of a doctor knife or other means known in the coating art:

*Example 6*

| | Per cent |
|---|---|
| Cellulose nitrate | 17.5 |
| Ethyl acetate | 16.3 |
| Denatured alcohol | 24.5 |
| Dibutyl phthalate | 6.0 |
| High melting paraffin wax | 4.0 |
| Paraffin oil | 3.0 |
| Toluol | 28.7 |
| | 100.0 |

The above size composition is sufficiently thin to partially penetrate the fabric and thus accomplish the objects set forth above. This composition comprises essentially cellulose nitrate, a plasticizer, and a wax, but it will be apparent to those skilled in the art that the invention is by no means limited to this particular type of size composition.

In some instances it is preferable to apply over a size composition such as disclosed above a second size composition comprising essentially wax. The following example illustrates a suitable composition of this type:

*Example 7*

Starch sizing_____ounces__ 6
Paraffin wax_____ounce__ 1
Water _____pints__ 3

This size composition should be applied to the fabric while hot enough to maintain even distribution of the wax.

The use of the size coats described above, while optional, is quite desirable where the article is to be laundered, because it not only affords the desirable properties mentioned above, but also provides a top surface more suitable to normal ironing operations, in that sticking tendencies are eliminated.

Following is a preferred complete method of the invention for forming products which are resistant to laundering and dry-cleaning operations:

(1) A cloth sheet is subjected to the action of any suitable water-repellant or water-insoluble material under such conditions as to saturate and fill the fibres with the water-repellant or water-insoluble material without filling or obstructing the pores of the fabric. For example, the sheet is brushed or sprayed with a solution of paraffin in benzene until the amount of paraffin which the fibers are capable of absorbing has been applied. The material is then dried in the atmosphere or under the influence of heat until the solvent has evaporated. The desired water-proofing or water-repelling effect may also be obtained by treating the material with a solution of the type described in Example 6.

(2) One surface of the thus treated cloth sheet is then coated with a filling-sizing material such, for example, as that described in Example 7, under such conditions as to effect slight impregnation, say to about one-third of the thickness of the sheet. This treatment results in slight stiffening of the material and sufficient closing of the pores of the material that the thermoplastic cement solution subsequently applied to the opposite surface will not pass entirely through the material.

(3) A solution of a suitable thermoplastic cement is then applied to the opposite surface of the sheet. The application of the thermoplastic cement to the sheet is preferably carried out in two or more steps. A light coating of the solution is preferably first applied and driven into the pores of the material, under the influence of pressure, a distance equal to about one-third of the thickness of the sheet. Any number of additional layers or coats may be applied over the first coat until a film of sufficient thickness for the desired purpose has been formed.

The thickness of the final film of thermoplastic cement will, in general, depend upon the thickness and texture of the sheet and the manner in which the finished article is to be employed.

Employing solutions of the type described in Examples 1 to 5 in forming films of thermoplastic cements, I have employed from about 12½ fluid ounces to 28 fluid ounces to the square yard in forming films of substantially uniform thicknesses on fabrics ranging from sheer chiffons to heavy felts.

(4) After the thermoplastic cement has been applied, the opposite side of the sheet may be treated again with a sizing-filling composition of the type described in Example 7 until the pores of the material have been suitably closed and the sheet suitably stiffened.

According to another preferred method of the invention, the procedure outlined above may be modified to achieve the results achieved in carrying out steps 1 and 2 above, by means of a single step. According to the modified procedure, the original cloth sheet may be treated with a solution similar to that described in Example 6 but containing a somewhat higher percentage of solids or film-forming materials. Solutions containing about 20 to 50 percent more solids or film-forming materials than the solution described in Example 6 may be employed satisfactorily. The solution containing the desired amount of solids or film-forming material is applied to one surface of the sheet while warm (about 80 to 90° F.) and sufficiently fluid to penetrate about 50 to 60 percent of the distance through the sheet.

The thus treated sheet may then be treated according to the procedures outlined in steps 3 and 4 above.

Any space in the interior of the sheet separating the thermoplastic cement applied to one surface and the water-proofing and/or sizing material applied to the other surface will be filled by the thermoplastic cement when the article is subsequently heated during the process of application.

When the original fabric as marketed is partially or completely sized and/or filled, the sizing and filling steps of the procedures outlined above may be modified or omitted as required. Among commercial fabrics which are partially or completely sized and/or filled are included suede leather cloth and natural leather such as is used for gloves.

When a fabric sheet has been coated with thermoplastic adhesive and, if desired, with one or both of the size coats above described, it may be united by heat and pressure to another fabric sheet or cut up into desirable decorations, or it may be stored in rolls for future use. The cutting operation for producing decorations may be performed by commercial cutting or stamping machines. The cut-out decorations may be applied immediately to the desired fabric base, or they may be attached lightly by pressure to a temporary fabric base, such as crinoline, and placed in a suitable wrapper for distribution and sale directly to the consumer. The ease and simplicity of permanent application to base fabrics make the decorations of the present invention of general utility, even to those unskilled in the art.

The affixing of a decoration may be carried out by using an ordinary household flat iron. The base fabric is ironed out at the position where the decoration is to be placed. For this purpose the iron should be used at low heat for sheer materials, intermediate heat for materials such as sheets and face towels, and higher heat for heavier materials, such as bath towels, bathing suits, sweaters, and the like. This will be obvious to those possessing even the most indifferent skill in the art.

The decoration is now placed in position and preferably over the face of it is placed a thin cloth, or the like. The iron is then placed on the decoration and held for a period of about 3 to 7 seconds. The material is then turned over with the decoration face down and the iron placed on the back of the material and pressed down for about 5 to 20 seconds. A variance in the time of ironing according to the weight of the material used will obviously be made. A temperature of 130–150° C. is usually preferred, and the article should be allowed to cool before handling.

When application of the decoration is being made to fabrics which are filled and stiffened by their manufacturing process, it is desirable to launder such fabrics before application of the decoration in order to get more permanent anchorage. In the event that any portion of the design should not be securely anchored during application, it will be automatically reanchored from the heat of the iron in subsequent launderings until a permanent and firm anchorage is secured.

In affixing the decoration to the fabric base, pressures on the order of from 2–3 pounds up to approximately 15–20 pounds per square inch, ordinarily secured by human force exerted on an ordinary flat iron, suffice, but higher pressures, for example, 500 pounds per square inch, and up, as obtained from suitable machinery may likewise be used advantageously.

The temperature of application obviously may be varied over a considerable range, depending somewhat upon the particular type of thermoplastic cement employed, but it is preferred not to go much over 150° C., at least not for more than a momentary heating, since some decomposition of the nitrocellulose may take place at higher temperatures. As to the lower limit of the temperature, it is preferable to so design the thermoplastic cement that there will be no undesirable stickiness at temperatures which may be normally encountered during shipping, and storage, so that usually a temperature of 40–50° C. at the lowest is desirable to provide a suitable bond. In particular instances the thermoplastic adhesive may be so designed that normal room temperatures permit the attainment of such a bond, provided higher pressures are used.

In preparing the thermoplastic adhesive it is preferred that its viscosity be so adjusted as to obtain a uniform film on the surface of the fabric with slight impregnation, as a considerable degree of impregnation will materially stiffen and perhaps discolor the fabric. A slight penetration, however, is essential in order that the superior adhesion characterizing articles according to the present invention may be obtained.

The thermoplastic adhesive not only serves to anchor the decoration to the fabric base, but also serves as a connecting link between the fibers of the decoration, thereby preventing the decorations from unravelling after they have been cut out.

The present invention is designed for the application of all types of fabric to a fabric base and is particularly suitable for the affixing of cloth decorations such as initials, monograms, patterns, designs, motifs, printed and/or woven names and labels to fabric bases such as are used in the manufacture of clothing, millinery, and accessories. The term "fabric" as used throughout the specification and in the claims is intended to include all fabric materials whether woven, knitted, felted, or compressed.

The present invention provides a very economical and simplified method for securing decorations to fabric bases. It will be apparent that the ordinary housewife can readily apply decorations prepared in accordance with this invention, to fabric bases. Furthermore, the decorations are firmly and permanently anchored to the fabric base and the adhesive film is waterproof so that the finished article will stand repeated launderings without loosening the decorations, and furthermore, dry cleaning may be employed. The waterproof size compositions also aid in resisting deterioration of the decorations in laundering and cleaning.

The appearance and "hand" of the finished article is substantially unchanged, since the adhesive is in itself flexible and does not impregnate to any considerable extent the fabric material to cause any change in its natural properties. Furthermore, by employing the type of thermoplastic cement herein disclosed, the cement film has no appreciable tendency to harden and stiffen after long use and, as a result the finished article is as satisfactory at all times as when the decoration is first applied to the fabric base.

The accompanying drawing illustrates several products of my invention. Fig. 1 shows an exaggerated section of a layer or sheet of untreated cloth provided with an adhering layer or film of thermoplastic cement with the cement penetrating the cloth to a slight extent. Fig. 2 shows a similar section of a layer or sheet of cloth impregnated with a sizing composition. Fig. 3 is a plan view of cloth base having a decoration in the form of an initial or letter attached thereto by means of thermoplastic cement. Fig. 4 is an exaggerated section of a fragment of the article shown in Fig. 3, the letter or initial, comprising a layer or sheet of cloth provided with a layer or film of thermoplastic cement, having been attached to the cloth base through the application of heat and pressure. The cement penetrates the cloth of the letter or initial and the base to a slight extent.

As many apparently widely different embodiments of this invention may be made without departing from the spirit and scope thereof, it is to be understood that the invention is not limited to the specific embodiments thereof except as defined in the appended claims.

I claim:

1. The method of applying a cloth decoration to a cloth base which comprises coating one surface of a cloth layer or sheet with a thermoplastic cement comprising a cellulose xanthate and a thermoplastic resin compatible therewith, cutting a decorative design out of said layer or sheet, and applying said design to the cloth base with the cement-coated surface against said cloth base by means of heat and pressure, the amount of cement employed being such that the resulting product is soft and pliable.

2. A fabric decoration having an adhering film of a thermoplastic cement comprising a cellulose xanthate and a thermoplastic resin compatible therewith.

3. An article comprising a fabric base having united thereto a fabric decoration by means of an intermediate film of a thermoplastic cement comprising a cellulose xanthate and a thermoplastic resin compatible therewith.

4. A fabric decoration having an adhering film of thermoplastic cement comprising a cellulose xanthate and a polyhydric alcohol-polybasic acid synthetic resin.

ROY W. SEXTON.